Oct. 2, 1928.
E. E. HANS ET AL
1,685,916
GAUGE
Filed April 20, 1925    2 Sheets-Sheet 2
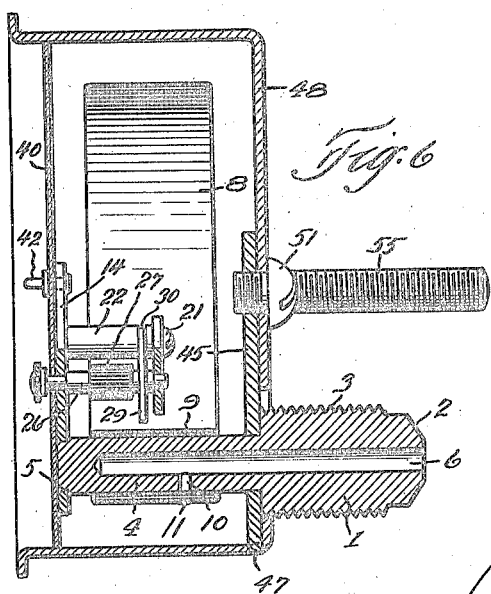
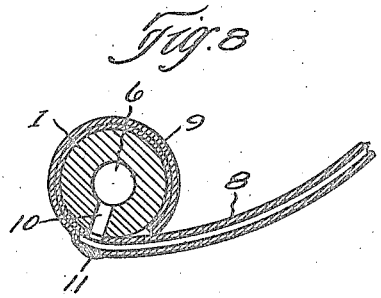
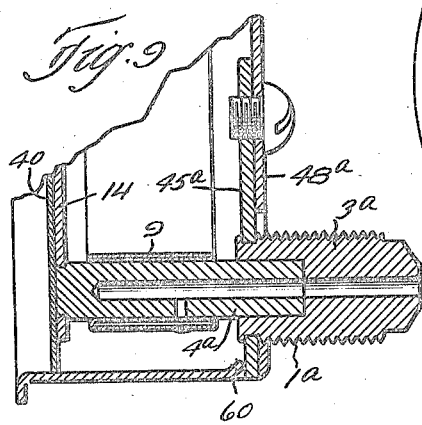
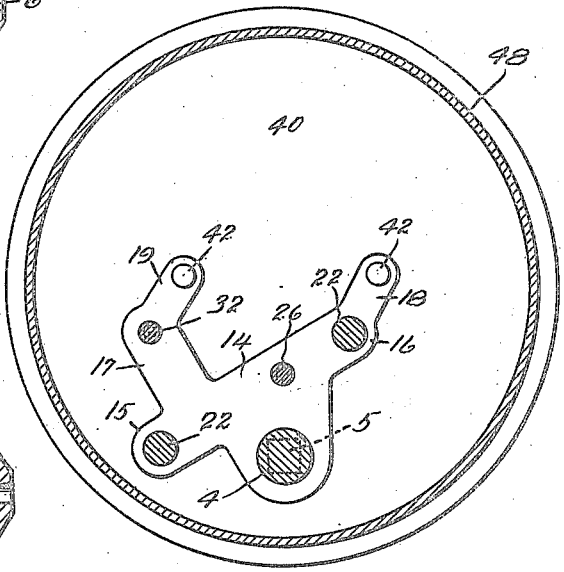
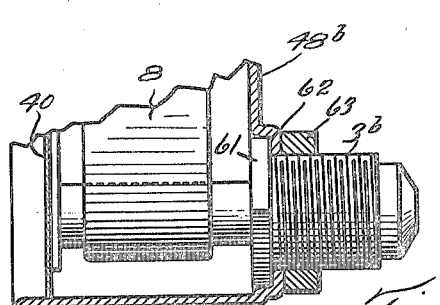

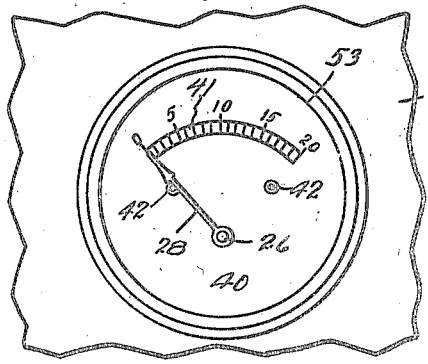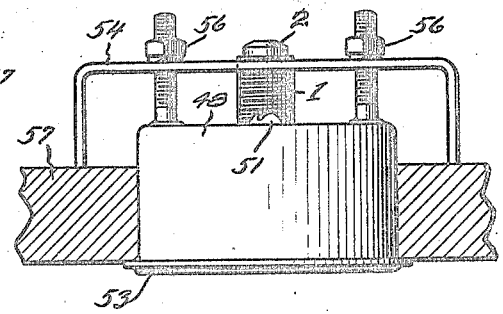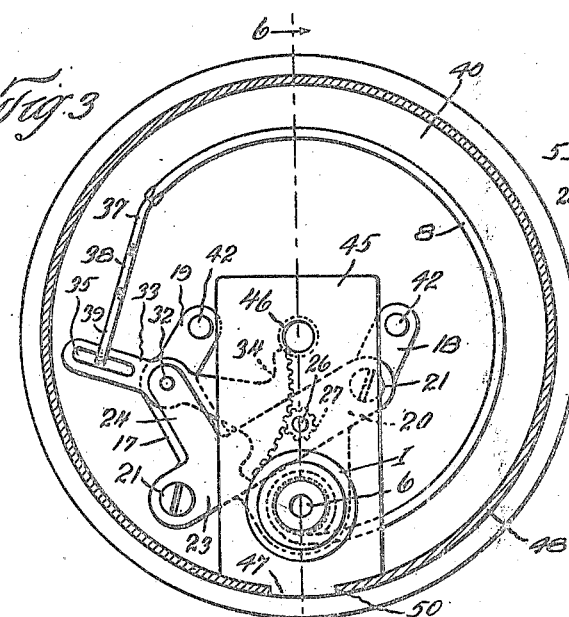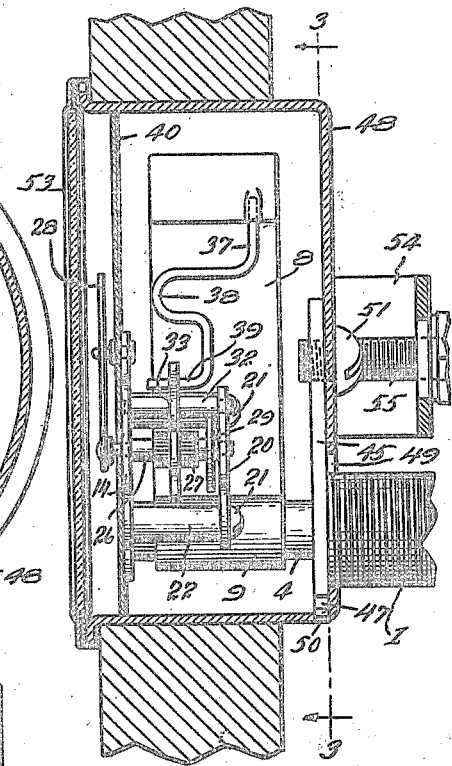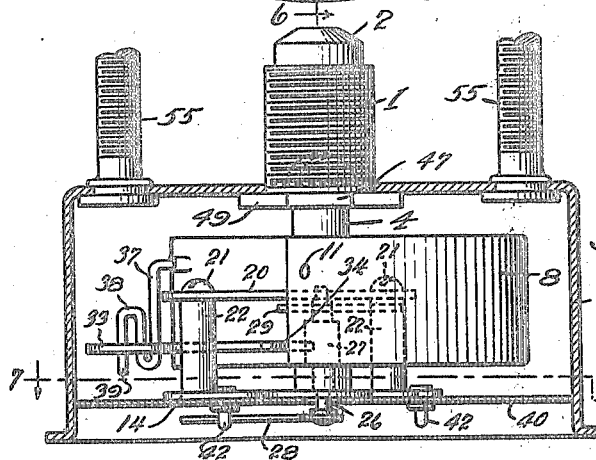

Patented Oct. 2, 1928.

1,685,916

UNITED STATES PATENT OFFICE.

EDMUND E. HANS AND ROBERT HENRY, OF DETROIT, MICHIGAN, ASSIGNORS TO WALTER M. SCOTT, OF LAKEWOOD, OHIO, AND RALEIGH E. TRESISE, OF CLEVELAND HEIGHTS, OHIO.

GAUGE.

Application filed April 20, 1925. Serial No. 24,389.

This invention relates to gauges and is directed more particularly to pressure gauges of the Bourdon type.

The primary object of the present invention is to provide a pressure gauge which is particularly simple in construction, inexpensive to manufacture, durable and efficient in use and which is light in weight.

Another object is to provide a pressure gauge wherein the entire assembly is supported as a unit by the inlet nipple, thus avoiding any danger of warping the various elements thereof when fastening the same in the case.

A further object is to provide a gauge wherein the dial is fastened in place by means of two stop pins located one adjacent each end of the graduated portion of the dial, such stop pins serving also to limit the movement of the indicating needle and the radial movement of the Bourdon tube.

A further object of the invention is to provide a gauge of the character described which is particularly adapted for use with automobiles and in which the working parts are supported by the inlet nipple or socket.

A further object of the invention is to provide a gauge in which the casing in which the working parts are enclosed is provided with an opening in its rear wall offset with respect to the center thereof whereby the Bourdon tube may be secured directly to the inlet nipple thus obviating the necessity for providing bores or passageways for connecting the inlet nipple with the Bourdon tube.

A still further object of the invention is to provide a gauge of the class described which eliminates the necessity for metal castings and in which the inlet nipple is made from a product of a screw machine and the plate for securing the nipple to the casing is a metal stamping whereby to better adapt the device for quantity production at comparatively low costs.

A still further object is to provide a gauge of the aforesaid character which shall include novel means for fastening the gauge unit in the casing so as to require only one fastening screw but which shall effectively prevent rotation of the unit with respect to the casing.

With these and other objects in view, the invention consists in the various novel features of construction and arrangement or combination, all of which will be fully described hereinafter and pointed out in the appended claims.

In the drawings accompanying and forming part of this application, Fig. 1 is a front elevation of a gauge constructed in accordance with our invention; Fig. 2 is a top plan view thereof; Fig. 3 is an enlarged vertical sectional view taken on the line 3—3 of Fig. 4; Fig. 4 is a vertical sectional view through the gauge casing but showing the interior mechanism in side elevation; Fig. 5 is a horizontal sectional view through the gauge casing but showing the interior mechanism in bottom plan view; Fig. 6 is a vertical sectional view taken on the line 6—6 of Fig. 3; Fig. 7 is a vertical sectional view taken on the line 7—7 of Fig. 5; Fig. 8 is a detail sectional view through the inlet nipple showing the Bourdon tube attached thereto; Fig. 9 is a detail sectional view of a modified form of construction; and Fig. 10 is a detail view partly in section and partly in elevation of a further modification.

Describing the various parts by reference characters, 1 denotes the inlet nipple which serves as the support for the gauge mechanism to be described in detail hereinafter. This inlet nipple is preferably formed with a tapered seating portion 2 at one end, a threaded portion 3 adjacent said end, and a reduced extension 4 which terminates in a reduced prismatic portion 5. A bore 6 extends from the end adjacent the seating portion 2 to a point adjacent the prismatic portion 5 as clearly shown in Fig. 6. Due to the shape of the inlet nipple, it may be easily and quickly formed as a screw machine product and can be turned out in large quantities at a relatively small cost.

A Bourdon tube 8, having the usual arcuate shape is fastened to the reduced extension 4 of the inlet nipple by bending one end of said tube to define an eye 9 whose diameter is substantially equal to the diameter of extension 4. The eye 9 is slipped over the extension 4 and these two elements are then fastened together by solder or other suitable fastening means. Communication is then established between bore 6 of the nipple and the Bourdon tube by drilling through the tube and nipple as indicated at 10, whereupon the aperture in the outer wall of the tube is closed by a drop of solder 11 or other suitable plug.

Mounted on the prismatic end 5 of the nipple is a bracket 14 which may be a stamping from sheet metal and of a shape similar to that shown in Fig. 7. This bracket is preferably formed with diametrically extending arms 15 and 16 and upwardly extending arms 17 and 18, the arm 17 having an extension 19 arranged parallel with arm 18. A second bracket 20, also in the form of a sheet metal stamping, is arranged in spaced parallel relation to bracket 14 and fastened thereto by screws 21 threaded into posts 22 which project from arms 15 and 16. The bracket 20 is of a shape similar to that shown in Fig. 3 and consists essentially of an arm 23 extending between posts 22 and a second arm 24 arranged at right angles thereto and overlying arm 17 of bracket 14.

Journaled between the brackets 14 and 20 is a spindle 26 which carries a pinion 27 and the outer reduced ends of the spindle project through suitable apertures in the brackets, the end projecting through bracket 14 having an indicating needle 28 affixed thereto. A coiled hair spring 29 has the inner end thereof fastened to spindle 26 and the outer end positioned in a groove 30 formed in one of the posts 22 and fastened thereto by deflecting the walls of the groove over the end of the spring. A second spindle 32 is journaled between arms 17 and 24 of brackets 14 and 20 and this spindle carries a lever 33 having a segmental gear 34 at one end which is meshed with pinion 27, while the opposite end of said lever is formed with a slot 35. The free end of Bourdon tube 8 is closed and provided with an arm 37 which is preferably formed with a U-shaped bend 38 and a hooked end 39 that is engaged in slot 35 of lever 33.

A suitable dial 40, having a graduated scale 41 on the front thereof, is fastened to arms 18 and 19 of bracket 14, by stop pins 42 which are riveted thereto. These stop pins in addition to providing a simple and inexpensive fastening means for the dial, also serve as stops for minimum and maximum positions of the indicating needle 28 and prevent excessive distortion of the Bourdon tube due to an excessive pressure being applied to the gauge.

A plate 45 is fastened to the inlet nipple against the shoulder defined by the threaded portion 3 and the reduced extension 4, and this plate is formed with a threaded aperture 46 and a lug 47.

From the foregoing description, it will be obvious that the entire gauge mechanism is supported and carried by the inlet nipple 1. This unit is easily and quickly fastened in a sheet metal cup shaped casing 48 by entering the threaded portion of the nipple through a slightly elongated opening 49 in the rear wall of the casing and then seating the lug 47 in an aperture 50 formed in the side wall of the casing, whereupon threaded aperture 46 in plate 45 will align with an opening in the rear wall of the casing to receive a fastening screw 51. A suitable glass front 53 is applied to casing 48 to protect the indicating needle and exclude foreign matter. The gauge is fastened in position by any suitable arrangement, as for instance, by means of a U shaped clamp bar 54 which is engaged over threaded studs 55 that project from the rear wall of casing 48. By tightening nuts 56 applied to studs 55, the bar 54 will be forced against the rear side of the instrument board 57 or other suitable support. A conduit, not shown, connects in the usual manner with the threaded portion of the inlet nipple so that fluid will be conducted to the gauge.

In operation, fluid will enter bore 6, thence through bore 10 to the Bourdon tube 8, causing the tube to tend to straighten in proportion to the pressure of the fluid therein. The arm 37 connected to the free end of the tube will exert a pull on lever 33 which in turn will rotate pinion 27 and indicating needle 28 a proportional distance. When the pressure is relieved, hair spring 29 will return the parts to normal position.

When assembling the gauge, a zero correction for the indicating needle may be easily and quickly made by inserting a screw driver or other instrument in the U shaped bend of arm 37 and spreading said bend to increase the length of the arm, or by closing up U shaped bend 38, the effective length of the arm may be shortened. By reason of the pin and slot connection between arm 37 and lever 33, the end of the tube 8 is free to move without binding and hence an accurate reading over the entire scale is insured. The danger of causing permanent distortion of tube 8 due to excessive pressure being applied thereto is minimized by the stop pin 42 which limits the movement of indicating needle 28 and the parts connected thereto including tube 8.

A gauge constructed as described above is devoid of all castings and hence is light in weight, and may be easily and quickly assembled at small expense.

In Fig. 9 we have shown a modified construction of the inlet nipple and fastening means for the plate 45ª. In this instance the inlet nipple 1ª is formed of two parts press fitted or sweated together and consisting of a threaded portion 3ª having a recess therein to receive a reduced rod 4ª, the effect being the same as the inlet nipple previously described. In this view is also illustrated a modified fastening for plate 45ª which is carried by the threaded portion 3ª of the nipple, and the lower end whereof is engaged between the rear wall of the casing 48ª and a lug 60 struck up from the side wall of such casing. In other respects the gauge is identical with that previously described.

In Fig. 10 we have shown a further modification wherein the inlet nipple is provided with a prismatic portion 61, adjacent the inner end of threaded portion 3ᵇ, which is adapted to seat in a similar shaped depression 62 formed in the rear wall of the casing 48ᵇ. A nut 63 applied to threaded portion 3ᵇ retains the parts in position. This construction prevents rotation of the gauge structure with respect to the casing and eliminates plate 45. In other respects the gauge is identical with that previously described.

Having thus described our invention, what we claim is:

1. A gauge mechanism comprising an inlet nipple having a threaded portion and a reduced extension, a bracket carried by said reduced extension, a second bracket connected to and arranged in spaced relation to the first bracket, a spindle journaled in said brackets, an indicating needle connected to said spindle, a graduated dial disposed in operative relation to said indicating needle, stop pins disposed adjacent each end of the graduated portion of said dial, said stop pins serving to support said dial from the first mentioned bracket, a Bourdon tube having one end connected to said reduced extension, and means connecting the opposite end of said tube with said spindle, said means including a bendable element to provide a zero correction for said needle.

2. A gauge mechanism comprising a casing having an aperture in the rear wall and a second aperture in the side wall, a gauge unit adapted to be disposed within said casing, said unit having an inlet nipple adapted to project through the aperture in said rear wall, a plate carried by said nipple and having a lug adapted to project through the aperture in said side wall, and additional means for fastening said unit in said casing.

3. A gauge mechanism comprising a casing having an aperture in the rear wall and a second aperture in the side wall, a gauge unit adapted to be disposed within said casing, said unit having an inlet nipple adapted to project through the aperture in said rear wall, a plate carried by said nipple and having a lug adapted to project through the aperture in said side wall, and a screw extending through the rear wall of said casing and threaded into said plate.

4. A gauge mechanism comprising an inlet nipple having a threaded portion, a prismatic end formed thereon, a sheet metal bracket fastened to said prismatic end, a second sheet metal bracket carried by the first bracket and arranged in spaced relation with respect thereto, a spindle journaled between said brackets and having a pinion gear thereon, an indicating needle carried by said spindle, a sheet metal lever journaled between said brackets, said lever having a segmental gear at one end meshed with said pinion, the opposite end of said lever having a slot formed therein, a Bourdon tube supported by and connected with said inlet nipple, and a bendable arm extending from the free end of said tube and engaged in the slot in said lever.

5. A gauge unit of the class described comprising a casing having an opening in its rear wall, gauge mechanism arranged within said casing and including a plate having an opening therein adjacent one edge thereof, an inlet nipple secured within the opening in said plate and having a portion extending inwardly through said plate and into said casing, a Bourdon tube secured to and supported by said inwardly extending portion, said plate having a portion disposed in interlocking engagement with said casing, additional means for securing said plate against relative movement with respect to said casing, said nipple having a bore therein and said tube and nipple having registering apertures connecting the interior of said tube with said bore.

In testimony whereof, we hereunto affix our signatures.

EDMUND E. HANS.
ROBERT HENRY.